(12) United States Patent
Kwon

(10) Patent No.: US 12,344,149 B2
(45) Date of Patent: Jul. 1, 2025

(54) SELECTIVELY MOUNTABLE ASSIST HANDLE FOR A VEHICLE

(71) Applicant: GM Global Technology Operations LLC, Detroit, MI (US)

(72) Inventor: Jintaek Kwon, Seoul (KR)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 244 days.

(21) Appl. No.: 18/184,771

(22) Filed: Mar. 16, 2023

(65) Prior Publication Data

US 2024/0308405 A1  Sep. 19, 2024

(51) Int. Cl.
*B60N 3/02* (2006.01)

(52) U.S. Cl.
CPC ............. *B60N 3/026* (2013.01); *B60N 3/023* (2013.01)

(58) Field of Classification Search
CPC ..... B60N 3/023; B60N 3/026; E04F 11/1808; E04F 11/1804; E04F 11/1863
USPC ........................................................ 296/1.02
See application file for complete search history.

(56) References Cited

U.S. PATENT DOCUMENTS

| | | | | |
|---|---|---|---|---|
| 4,626,016 A * | 12/1986 | Bergsten | .................. | B60N 3/02 105/354 |
| 6,340,189 B1 * | 1/2002 | Pordy | .................... | B60N 3/026 16/110.1 |
| 6,799,353 B1 * | 10/2004 | Stewart | .................. | B60N 3/023 16/110.1 |
| D516,009 S * | 2/2006 | Kontorovich | .................... | D8/14 |
| 8,240,710 B1 * | 8/2012 | Rawls | ...................... | B60R 3/005 182/113 |
| 8,251,423 B1 * | 8/2012 | Lingle | ....................... | B60R 3/00 296/1.02 |
| 8,678,457 B1 * | 3/2014 | Duderstadt | ............... | B60R 3/00 296/1.02 |
| 8,708,386 B2 * | 4/2014 | Abe | ......................... | B60N 3/02 296/1.02 |
| 8,925,155 B2 * | 1/2015 | Grudzien | ............ | E04F 11/1863 16/110.1 |
| D766,809 S * | 9/2016 | Deng | ........................... | D12/400 |
| 9,637,930 B2 * | 5/2017 | Grudzien | ............ | E04F 11/1863 |
| 9,700,109 B2 * | 7/2017 | Gordin | ..................... | A45B 1/04 |
| 9,889,782 B2 * | 2/2018 | Gobart | ..................... | B60N 3/02 |
| 10,173,595 B1 * | 1/2019 | Ulrich | ....................... | B60R 3/02 |
| 10,259,417 B1 * | 4/2019 | Ratkovich | ............... | B60N 3/02 |
| 10,829,022 B2 * | 11/2020 | Patterson | .................. | B60R 3/02 |
| 11,377,040 B2 * | 7/2022 | Salter | ..................... | E05B 85/04 |

(Continued)

FOREIGN PATENT DOCUMENTS

KR  102546526 B1 * 6/2023 ............. B60S 3/045

OTHER PUBLICATIONS

Translation of KR102546526 (Year: 2025).*

*Primary Examiner* — Jason S Morrow

(74) *Attorney, Agent, or Firm* — CANTOR COLBURN LLP

(57) ABSTRACT

A selectively mountable assist handle for a vehicle includes an attachment member selectively mountable to a vehicle structural support member. The attachment member includes a structural support engagement element, and a gripping member support coupled to the structural support engagement element. A gripping member is mounted to the gripping member support coupled to the structural support engagement element.

20 Claims, 4 Drawing Sheets

(56) References Cited

U.S. PATENT DOCUMENTS

| | | | |
|---|---|---|---|
| 2005/0133078 A1* | 6/2005 | Fujitsubo | B60N 3/026 135/72 |
| 2023/0294584 A1* | 9/2023 | Rusche | B60N 3/026 296/1.02 |
| 2024/0141651 A1* | 5/2024 | Tuckey | E04F 11/1804 |
| 2024/0190322 A1* | 6/2024 | Neff | B60P 1/003 |
| 2024/0198882 A1* | 6/2024 | Hammelef | B60N 3/023 |
| 2024/0317279 A1* | 9/2024 | Bleth | B61D 15/06 |

* cited by examiner

SELECTIVELY MOUNTABLE ASSIST HANDLE FOR A VEHICLE

INTRODUCTION

The subject disclosure relates to the art of vehicles and, more particularly, to a selectively mountable assist handle for a vehicle.

Most passenger vehicles include fixed assist handles that may be used by passengers as an aide in getting into and out from the vehicle. The handles are typically mounted along an upper edge of a door frame. The location of the assist handles varies and may depend on various factors including seat configuration, door frame structure, and the like. In addition to factory assist handles which are fixedly mounted to the vehicle, there exist after-market assist handles that interact with door latch features. After the door is opened, the after-market assist handle is temporarily inserted into the door latch feature to provide a support surface that may aid a passenger in entering or exiting the vehicle.

Unfortunately, many users find the position of the assist handle to be impractical for their particular needs. The handle may be too far forward, or may be otherwise out of reach. Children, in particular, find entering a sport utility vehicle (SUV) difficult and are typically unable to reach or otherwise avail themselves of the provided handle. If not in a convenient location for the user, the assist handle may not be utilized. In such a case, the user may find it difficult to get into or out from the vehicle. Accordingly, it is desirable to provide an assist handle that may be adjusted to suit a particular user's needs.

SUMMARY

A selectively mountable assist handle for a vehicle, in accordance with a non-limiting example, includes an attachment member selectively mountable to a vehicle structural support member. The attachment member includes a structural support engagement element, and a gripping member support. A gripping member is mounted to the gripping member support coupled to the structural support engagement element.

In addition to one or more of the features described herein the gripping member support includes a first end portion connected to the structural support engagement element and a second end portion.

In addition to one or more of the features described herein the structural support engagement element includes a locking feature that forms a frictional engagement with the vehicle structural support member.

In addition to one or more of the features described herein the structural support engagement element includes a blade-like profile including a first end, a second end, and an intermediate portion extending between the first end and the second end, the gripping member support being secured to the intermediate portion.

In addition to one or more of the features described herein the intermediate portion includes an upper edge defining the locking feature and a lower edge, the gripping member support being secured to the upper edge.

In addition to one or more of the features described herein the upper edge and the lower edge define a material thickness of the structural support engagement element.

In addition to one or more of the features described herein the upper edge extends from the gripping member support to the first end at a first non-zero angle and from the gripping member support to a second non-zero angle, and the lower edge extends directly between the first end and the second end at a zero angle.

In addition to one or more of the features described herein a gripping member interface is coupled to the gripping member support, the gripping member being connected to the gripping member support through the gripping member interface.

In addition to one or more of the features described herein a handle element connected to the second end portion of the gripping member support.

In addition to one or more of the features described herein the gripping member includes a first side surface including a first recess and a second side surface, opposite the first side surface, including a second recess, the first recess and the second recess defining gripping features.

A vehicle, in accordance with a non-limiting example, includes a body defining a passenger compartment. The body includes a structural support member and a selectively mountable assist handle detachably mounted to the structural support member, the selectively mountable assist handle including an attachment member selectively mounted to the structural support member. The attachment member includes a structural support engagement element, and a gripping member support coupled to the structural support engagement element. A gripping member is mounted to the gripping member support.

In addition to one or more of the features described herein the gripping member support includes a first end portion connected to the structural support engagement element and a second end portion.

In addition to one or more of the features described herein the structural support engagement element includes a locking feature that forms a frictional engagement with the structural support member.

In addition to one or more of the features described herein the structural support engagement element includes a blade-like profile including a first end, a second end, and an intermediate portion extending between the first end and the second end, the gripping member support being secured to the intermediate portion.

In addition to one or more of the features described herein the intermediate portion includes an upper edge defining the locking feature and a lower edge, the gripping member support being secured to the upper edge.

In addition to one or more of the features described herein the upper edge extends from the gripping member support to the first end at a first non-zero angle and from the gripping member support to a second non-zero angle, and the lower edge extends directly between the first end and the second end at a zero angle.

In addition to one or more of the features described herein the structural support member includes a first side, a second side, and an opening receptive of the structural support engagement element.

In addition to one or more of the features described herein a support element is arranged at the second side of the structural support member, the support element including another opening receptive of the structural support engagement element, the support element including a surface engaged by the locking feature.

In addition to one or more of the features described herein a handle element is connected to the second end portion of the gripping member support.

In addition to one or more of the features described herein the gripping member includes a first side surface including a first recess and a second side surface, opposite the first side, including a second recess, the first recess and the second recess defining gripping features.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
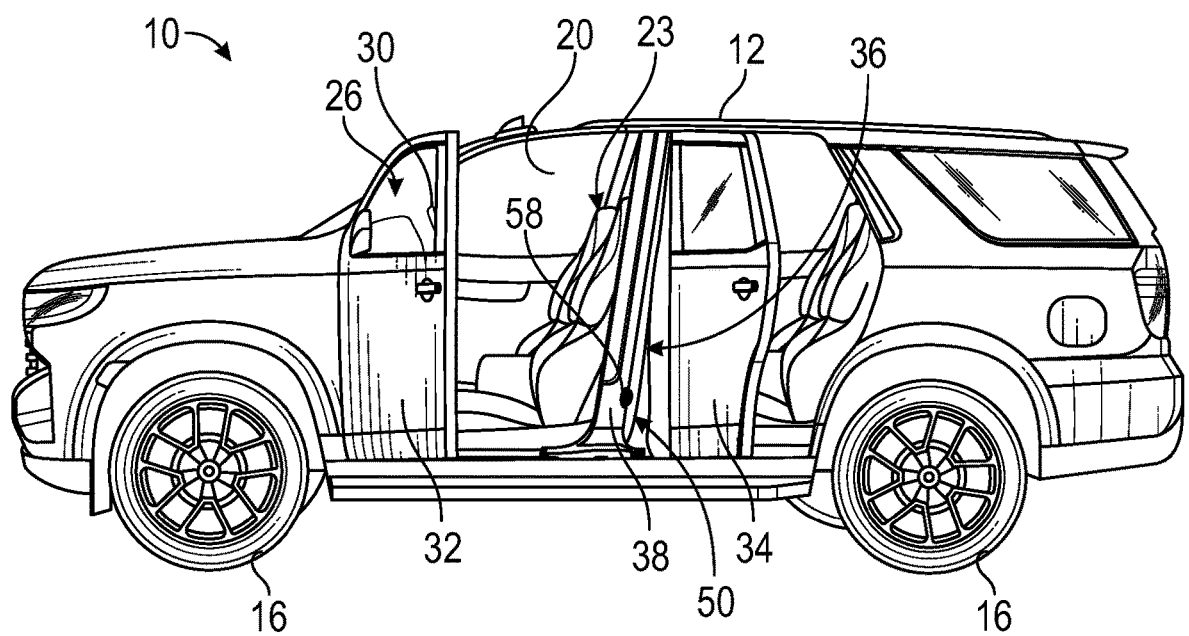
FIG. 1 is a left side view of a vehicle including a seat having a component including a selectively mountable assist handle, in accordance with a non-limiting example.

The following description is merely exemplary in nature and is not intended to limit the present disclosure, its application or uses. It should be understood that throughout the drawings, corresponding reference numerals indicate like or corresponding parts and features.

A vehicle, in accordance with a non-limiting example, is indicated generally at 10 in FIG. 1. Vehicle 10 includes a body 12 supported on a plurality of wheels 16. Body 12 defines, in part, a passenger compartment 20 having seats, one of which is indicated at 23. Seat 23 is positioned behind a dashboard 26. A steering control system 30 is arranged between seat 23 and dashboard 26. Body 12 includes a front door 32 and a rear door 34 that provide access to passenger compartment 20. Front door 32 and rear door 34 are separated by a structural support member 36 shown in the form of a "B"-pillar 38. Body 12 includes additional structural support members (not shown).

Figure 2:
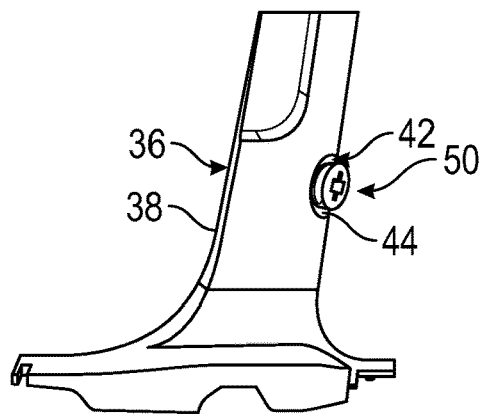
FIG. 2 is a partial perspective view of a structural pillar in the vehicle of FIG. 1 supporting the selectively mountable assist handle, in accordance with a non-limiting example.
Figure 3:
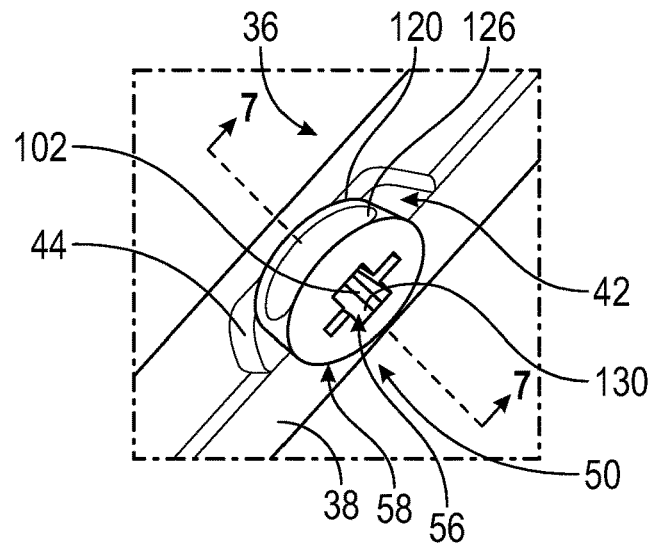
FIG. 3 is a detail view of the selectively mountable assist handle of FIG. 2, in accordance with a non-limiting example.

Referring to FIGS. 2 and 3, structural support member 36 includes a recess 42 having a first side 44 and a second side 46 (FIG. 7) that is opposite to first side 44. An opening 48 (FIG. 7) extends through structural support member 36 between first side 44 and second side 46. In accordance with a non-limiting example, a selectively mountable assist handle 50 is connected to structural support member 36 in recess 42. As will be described herein, selectively mountable assist handle 50 is rotatable locked to "B"-pillar 38 through opening 48. Selectively mountable assist handle 50 may be attached and/or removed as needed. The particular mounting location may vary and could include positions that may help children and/or elderly passengers to enter vehicle 10. Further, the number and location of recesses may vary.

Figure 4:
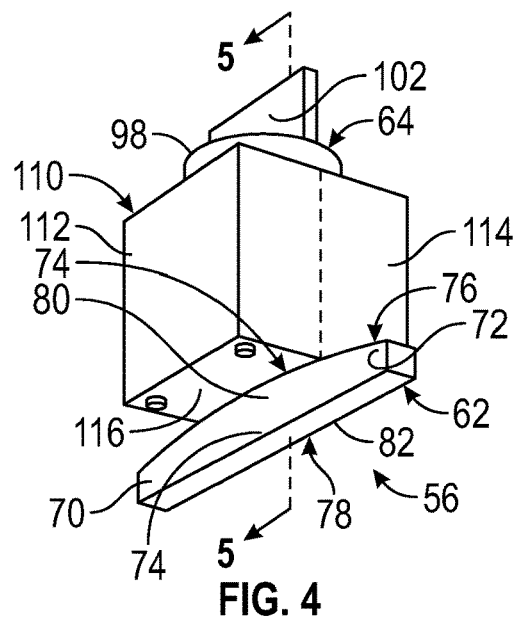
FIG. 4 is a partially disassembled view of the selectively mountable assist handle showing a gripping member support element and an attachment member, in accordance with a non-limiting example.
Figure 5:
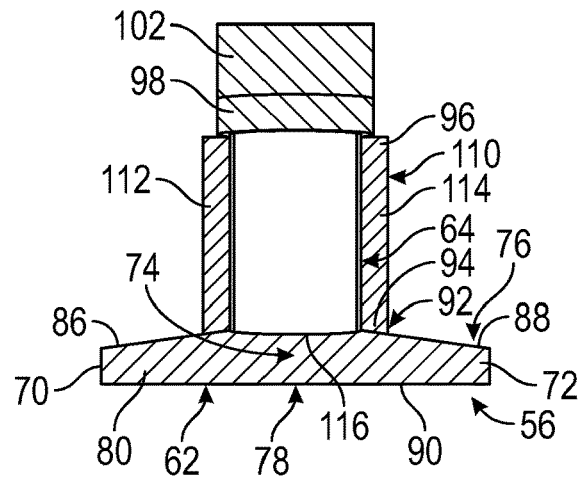
FIG. 5 is a cross-sectional side view of the gripping member support and attachment member of FIG. 4 taken through the line 5-5, in accordance with a non-limiting example.

Referring to FIGS. 4 and 5 and with continued reference to FIG. 3, selectively mountable assist handle 50 includes an attachment member 56 that serves as an interface with body 12 and a gripping member 58 that may be engaged by a passenger to aid in entering or exiting vehicle 10. In a non-limiting example, attachment member 56 includes a structural support engagement element 62 and a gripping member support 64. Structural support engagement element 62 includes a blade-like profile including a first end 70, a second end 72, and an intermediate portion 74 that extends between first end 70 and second end 72. Intermediate portion 74 defines a length of structural support engagement element 62.

In a non-limiting example, structural support engagement element 62 includes an upper edge 76 and a lower edge 78. Gripping member support 64 is joined with upper edge 76. Lower edge 78 is spaced from upper edge 76. A first side surface 80 and a second side surface 82 define a width of structural support engagement element 62. First side surface 80 is spaced from second side surface 82 by a material thickness of structural support engagement element 62. At this point, it should be understood that the term "blade-like" profile describes a geometry of structural support engagement element in which the length is greater than the width and the width is greater than the material thickness.

In a non-limiting example, upper edge 76 extends from gripping member support 64 toward first end 70 in a first direction at a first non-zero angle, and from gripping member support 64 toward second end 72 in a second direction at a second non-zero angle. Lower edge 78 extends directly between first end 70 and second end 72 at a zero angle. In a non-limiting example, upper edge 76 defines a locking feature. That is, when structural support engagement element 62 is passed through opening 48 and attachment member 56 is rotated, the first non-zero angle and the second non-zero angle cause upper edge 76 to lock into structural support member 36.

In a non-limiting example, gripping member support 64 includes a first end portion 94 and a second end portion 96. First end portion 94 is joined to upper edge 76 of structural support engagement element 62 at intermediate portion 74. Second end portion 96 supports a head member 98. That is, gripping member support 64 includes a generally circular cross-section having a first diameter and head member 98 includes a generally circular cross-section having a second diameter that is greater than the first diameter. Head member 98 promotes attachment of gripping member 58 through a frictional interface. A handle element 102 extends outwardly from head member 98. Handle element 102 may be gripped by a user when installing and/or removing selectively mountable assist handle 50 to structural support member 36.

In accordance with a non-limiting example, gripping member support 64 may carry a gripping member interface 110. Gripping member interface 110 includes a first section 112 and a second section 114 that sandwich about gripping member support 64. First section 112 and/or second section 114 may be connected to a base 116 that rests on first side 44 of recess 42 when selectively mountable assist handle 50 is installed. In a non-limiting example, when mounted to gripping member support 64, gripping member interface 110 includes a generally rectangular profile. In one non-limiting example, the generally rectangular profile may define a square.

Figure 6:
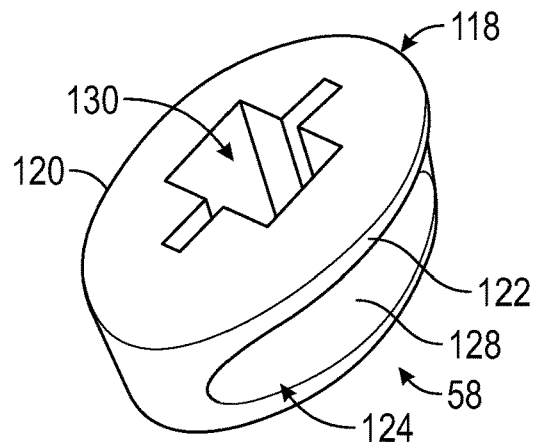
FIG. 6 is a perspective view of a gripping member of the selectively mountable assist handle, in accordance with a non-limiting example.
Figure 7:
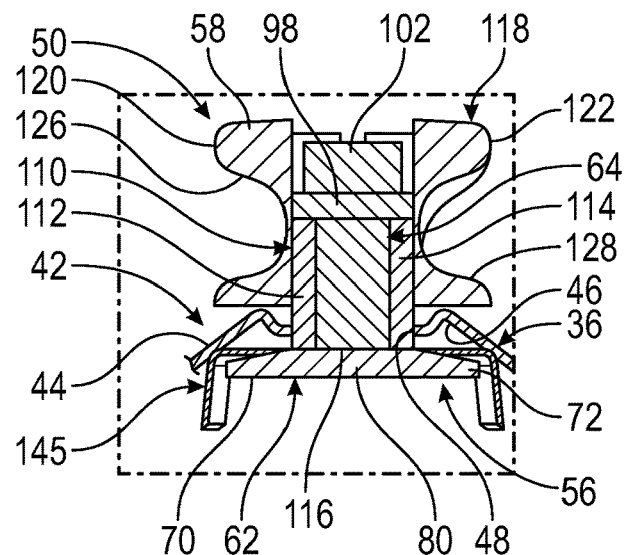
FIG. 7 is a cross-sectional side view the selectively mountable assist handle of FIG. 3 taken through the line 7-7, in accordance with a non-limiting example.

In a non-limiting example shown in FIGS. 6 and 7, gripping member 58 includes a gripping member body 118 having a first side surface 120 and a second side surface 122. First side 120 and second side 122 support gripping features 124. That is, a first recess 126 is formed in first side surface 120 and a second recess 128 is formed in second side surface 122. First recess 126 and second recess 128 are sized and shaped to be readily graspable by a user's hands and/or fingers. Gripping member body 118 is also including a central passage 130 that is sized and shaped to be receptive of gripping member support 64.

In a non-limiting example central passage 130 includes a generally rectangular shape that may be slightly smaller than the generally rectangular shape of gripping member interface 110. In this manner, once installed, gripping member 58 is less likely to come off from gripping member support 64 unintentionally. At this point, it should be readily apparent that gripping member 58 may take on a variety of sizes and shapes and could be tailors to specific user needs. For example, if targeted for use of toddlers, gripping member 58 may have a profile that matches a size of a toddler's hand. If targeted for use of the elderly, gripping member 58 may be sized and shaped to be engaged by elderly hands that may have a reduced grip strength.

Figure 8:
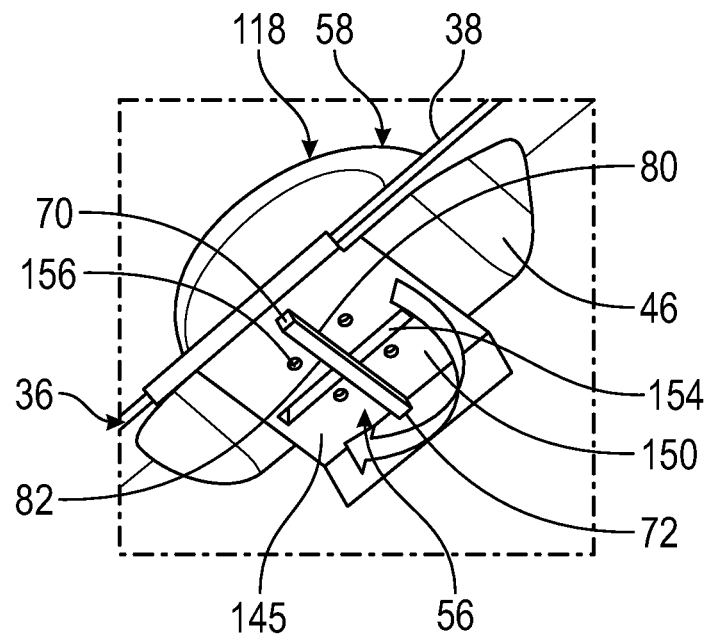
FIG. 8 is a rear view of the selectively mountable assist handle of FIG. 3, in accordance with a non-limiting example.
Figure 9:
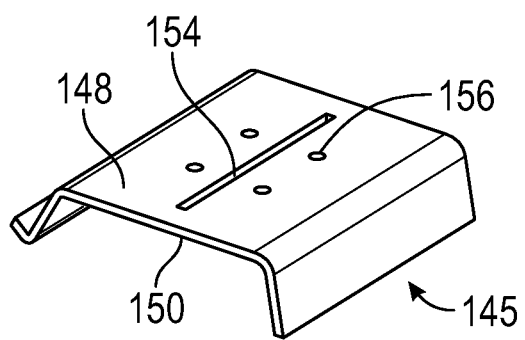
FIG. 9 is a perspective view of a support element for the selectively mountable assist handle, in accordance with a non-limiting example.

In a non-limiting example, selectively mountable assist handle 50 may include a support element 145 such as shown in FIGS. 8 and 9. Support element 145 includes a first surface 148 and a second surface 150 that is opposite to first surface 148. First surface 148 engages second side 46 of recess 42 and provides a robust attachment element for selectively mountable assist handle 50. Support element 145 includes a mounting opening 154 that is sized and shaped to receive the blade-like profile of structural support engagement element 62. Support element 145 may include additional openings, such as shown at 156, that accommodate fasteners (not shown). The fasteners may be employed to secure support element 145 to structural support member 36 at second side 46 of recess 42.

The terms "a" and "an" do not denote a limitation of quantity, but rather denote the presence of at least one of the referenced item. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical, and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A selectively mountable assist handle for a vehicle comprising:
    an attachment member selectively mountable to a vehicle structural support member, the attachment member including a structural support engagement element, and a gripping member support; and
    a gripping member mounted to the gripping member support,
    wherein the structural support engagement element includes a locking feature that forms a frictional engagement with the vehicle structural support member, and
    wherein the structural support engagement element includes a blade-shaped profile including a first end, a second end, and an intermediate portion extending between the first end and the second end, the gripping member support being secured to the intermediate portion.

2. The selectively mountable assist handle according to claim 1, wherein the gripping member support includes a first end portion connected to the structural support engagement element and a second end portion.

3. The selectively mountable assist handle according to claim 1, wherein the intermediate portion includes an upper edge defining the locking feature and a lower edge, the gripping member support being secured to the upper edge.

4. The selectively mountable assist handle according to claim 3, wherein the upper edge and the lower edge define a material thickness of the structural support engagement element.

5. The selectively mountable assist handle according to claim 3, wherein the upper edge extends from the gripping member support to the first end at a first non-zero angle and from the gripping member support to a second non-zero angle, and the lower edge extends directly between the first end and the second end at a zero angle.

6. The selectively mountable assist handle according to claim 2, further comprising a gripping member interface coupled to the gripping member support, the gripping member being connected to the gripping member support through the gripping member interface.

7. The selectively mountable assist handle according to claim 2, further comprising a handle element connected to the second end portion of the gripping member support.

8. The selectively mountable assist handle according to claim 2, wherein the gripping member includes a first side surface including a first recess and a second side surface, opposite the first side surface, including a second recess, the first recess and the second recess defining gripping features.

9. A vehicle comprising:
a body defining a passenger compartment, the body including a structural support member; and
a selectively mountable assist handle detachably mounted to the structural support member, the selectively mountable assist handle comprising:
an attachment member selectively mounted to the structural support member, the attachment member including a structural support engagement element, and a gripping member support coupled to the structural support engagement element; and
a gripping member mounted to the gripping member support,
wherein the structural engagement element is configured to be inserted through an opening in the vehicle support member in a first configuration and rotated with respect to the gripping member support to a second configuration in which the structural engagement element is not passable through the opening.

10. The vehicle according to claim 9, wherein the gripping member support includes a first end portion connected to the structural support engagement element and a second end portion.

11. The vehicle according to claim 9, wherein the structural support engagement element includes a locking feature that forms a frictional engagement with the structural support member.

12. The vehicle according to claim 11, wherein the structural support engagement element includes a blade-shaped profile including a first end, a second end, and an intermediate portion extending between the first end and the second end, the gripping member support being secured to the intermediate portion.

13. The vehicle according to claim 12, wherein the intermediate portion includes an upper edge defining the locking feature and a lower edge, the gripping member support being secured to the upper edge.

14. The vehicle according to claim 13, wherein the upper edge extends from the gripping member support to the first end at a first non-zero angle and from the gripping member support to a second non-zero angle, and the lower edge extends directly between the first end and the second end at a zero angle.

15. The vehicle according to claim 14, wherein the structural support member includes a first side, a second side, and an opening receptive of the structural support engagement element.

16. The vehicle according to claim 15, further comprising a support element arranged at the second side of the structural support member, the support element including another opening receptive of the structural support engagement element, the support element including a surface engaged by the locking feature.

17. The vehicle according to claim 10, further comprising a handle element connected to the second end portion of the gripping member support.

18. The vehicle according to claim 10, wherein the gripping member includes a first side surface including a first recess and a second side surface, opposite the first side, including a second recess, the first recess and the second recess defining gripping features.

19. A vehicle comprising:
a body defining a passenger compartment, the body including a structural support member; and
a selectively mountable assist handle detachably mounted to the structural support member, the selectively mountable assist handle comprising:
an attachment member selectively mounted to the structural support member, the attachment member including a structural support engagement element, and a gripping member support coupled to the structural support engagement element; and
a gripping member mounted to the gripping member support,
wherein the structural support engagement element includes a locking feature that forms a frictional engagement with the structural support member, and
wherein the structural support engagement element includes a blade-shaped profile including a first end, a second end, and an intermediate portion extending between the first end and the second end, the gripping member support being secured to the intermediate portion.

20. The vehicle according to claim 19, wherein the intermediate portion includes an upper edge defining the locking feature and a lower edge, the gripping member support being secured to the upper edge.

* * * * *